June 16, 1931. O. W. HEISE 1,809,898
CONTROLLING APPARATUS
Filed Aug. 26, 1925  4 Sheets-Sheet 4

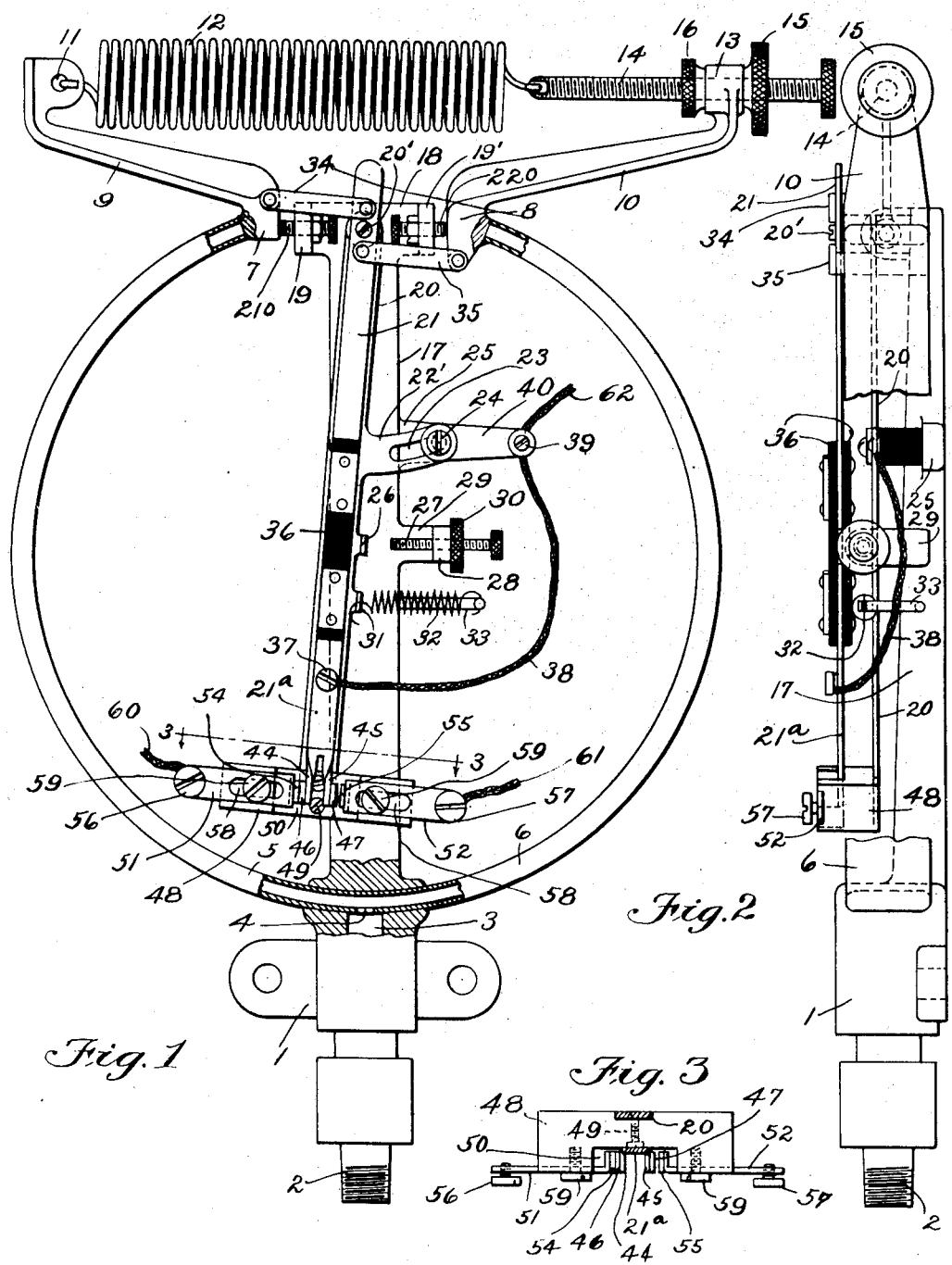

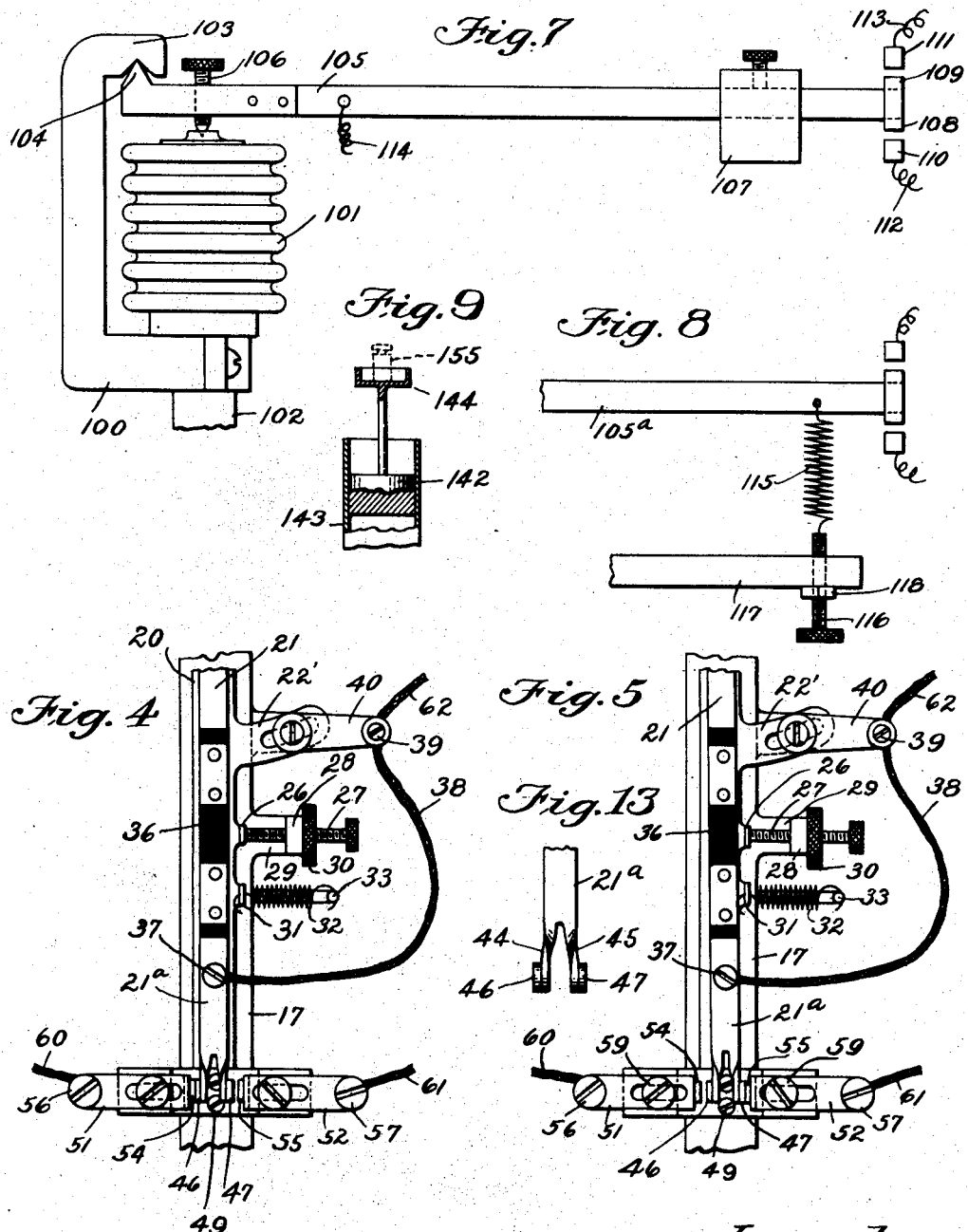

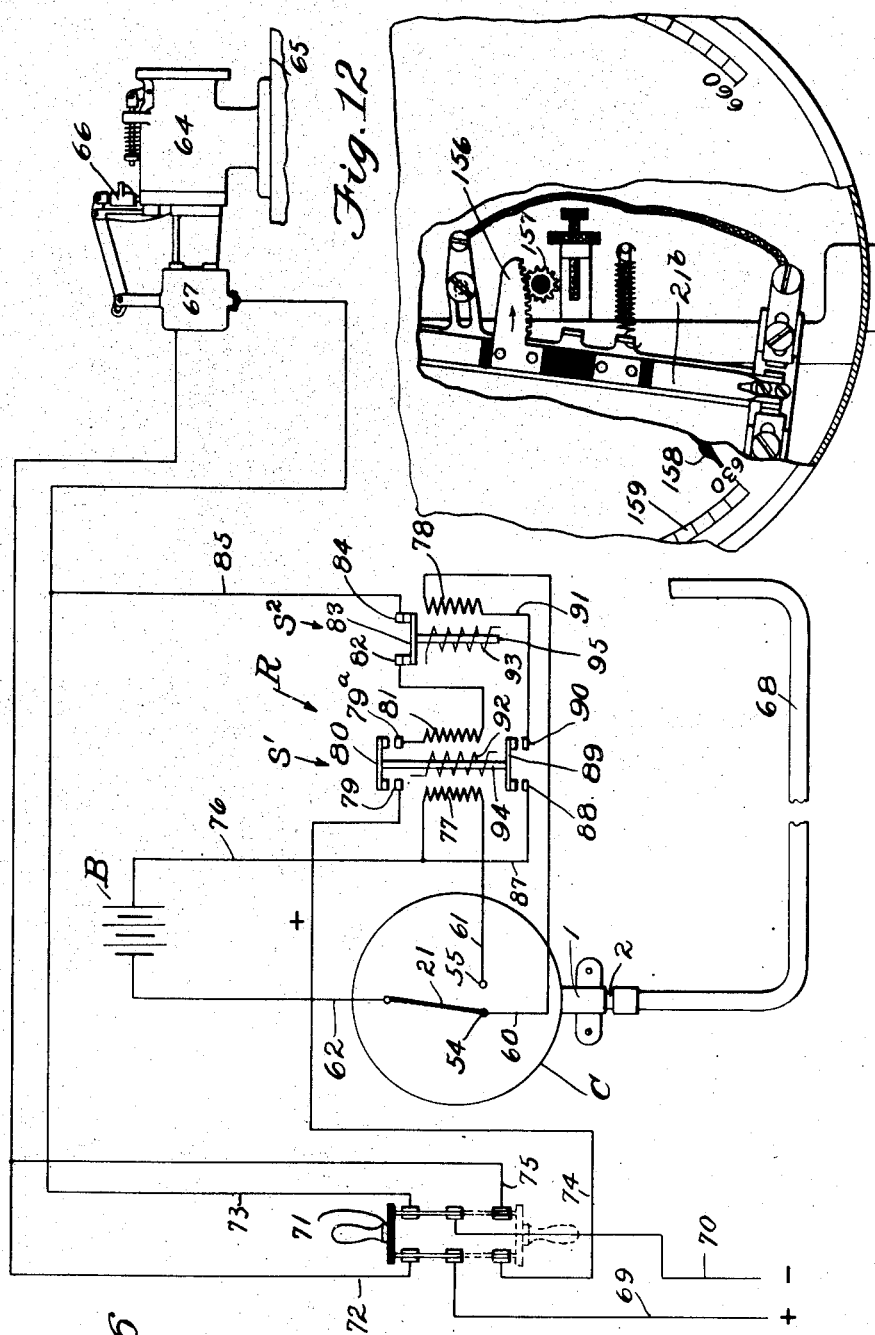

Inventor
Otto W. Heise
by Roberts, Roberts & Cushman
Att'ys

Patented June 16, 1931

1,809,898

UNITED STATES PATENT OFFICE

OTTO W. HEISE, OF BRIDGEPORT, CONNECTICUT, ASSIGNOR, BY MESNE ASSIGNMENTS, TO CONSOLIDATED ASHCROFT HANCOCK COMPANY, OF NEW YORK, N. Y., A CORPORATION OF DELAWARE

CONTROLLING APPARATUS

Application filed August 26, 1925. Serial No. 52,703.

This invention relates to automatic controllers of that general type in which there is employed an element sensitively responsive to physical change in a material substance, as for example, change in pressure, temperature or magnetic saturation and which by such response operates a movable part, for example a valve or electric switch whose movement in turn either directly or indirectly affects or indicates that physical characteristic of said material substance to whose variations the controller responds.

The novel principle of operation hereinafter disclosed is for convenience in illustration and description considered as embodied in an automatic controller comprising an element, for example a Bourdon tube, a thin walled metallic bellows (commonly termed and hereafter referred to as a sylphon) which moves or changes its shape in accordance with variations in internal pressure to which it is subjected and by such movement determines or indicates the pressure in a boiler, reservoir, or other receptacle to which the controller is connected.

In that embodiment of the invention herein chosen for convenience in description, the determination of the pressure in such boiler, reservoir or other receptacle is indirectly accomplished; the sylphon, Bourdon tube or other pressure sensitive element making and breaking an electrical circuit and thereby through suitable electro-magnetic means, for example, a motor, solenoid, magnet etc. operating a control or relief valve or gate. Such a valve may for example be a safety valve which is opened magnetically by said electro-magnetic means to relieve excess pressure in a boiler, the degree of pressure at which the valve opens being determined by the pressure sensitive element, to wit, the Bourdon tube, sylphon or the like, of the controller.

In many branches of the engineering art it is desirable freely to permit unrestrained progressive change in some characteristic of a physical substance, for example, temperature rise or fall, increase or decrease in fluid pressure, change in magnetic saturation, viscosity, or rate of fluid flow up to a predetermined point in such progress and thereafter automatically to control, regulate or observe further increments of change with great accuracy and precision. When the range of progressive change is very large, for example, in steam boiler practice where pressure up to 1200 pounds per square inch are coming into use, it is practically impossible to make an element which is sensitively responsive to the entire range of progressive change and which will also respond with the required degree of precision to minute increment of change at one end of said range.

When, as in the above cited example, the controller determines the actuation of a mechanical operated safety valve it is very essential that the controller respond with great accuracy to very slight changes in pressure at the upper end of the pressure range, for unless the controller be so responsive an excessive blow-down of the boiler with consequent loss in thermal efficiency is bound to follow.

In accordance with the novel principle which I have discovered and which I have embodied in the mechanism herein illustrated I am enabled to obtain the desired sensitiveness of the pressure responsive element of the controller, indicator or the like at the extreme upper limit of the pressure range, a variation of the order of 0.1% of the pressure being sufficient to produce the desired response.

Briefly stated, I have discovered that a pressure responsive device, for example, a Bourdon tube or sylphon designed to respond quickly and accurately to small pressure changes, for example, increments of pressure of the order of one pound per square inch may be loaded externally by means, for example, of a weight, until it makes no response whatsoever to the usual range of pressure variations for which it is designed but that when the internal pressure in such a Bourdon tube or sylphon increases to a point sufficient to balance the external load provided by the weight or other suitable means, the tube or sylphon immediately becomes responsive with its original degree of sensitiveness to any further increments of pressure. Such a low pressure tube or sylphon when thus loaded and subjected to high internal pressure maintains its original elasticity and apparently is not stressed in excess of its elastic limit.

Since it is not always convenient to employ a weight for loading the pressure responsive element, I sometimes substitute a spring therefor, but in making this substitution care must be exercised to choose a spring such that when the tube or sylphon begins to respond to increments of pressure the loading spring will not oppose an appreciably increasing load upon the tube or sylphon, in other words, the spring should have a sufficient number of turns and be of such length, diameter and wire gauge that its individual coils will not be appreciably distorted by the elongation of the spring as a whole corresponding to the minute movement of the tube or sylphon. Assuming the maximum relative amount of movement of the ends of the spring, it is a comparatively easy matter to design a spring having the desired characteristics.

In the accompanying drawings certain preferred embodiments of the invention have been illustrated by way of example and in the drawings:

Fig. 1 is a front elevation partly in section of a controller device embodying the present invention, such device being responsive to variations in fluid pressure and by such response making and breaking electrical circuits;

Fig. 2 is a side elevation, partly broken away, of the apparatus shown in Fig. 1;

Fig. 3 is a section substantially on the line 3—3 of Fig. 1;

Fig. 4 is a fragmentary elevation showing certain of the parts which appear in Fig. 1 but differently positioned;

Fig. 5 is a view similar to Fig. 4 but showing the parts in still another position;

Fig. 6 is a diagrammatic view showing the apparatus of Fig. 1 applied to the control of a safety valve, including electrical connections and a holding relay;

Fig. 7 is a fragmentary side elevation of diagrammatic character showing a slightly different embodiment of the invention;

Fig. 8 is a fragmentary view illustrating a possible modification of the arrangement of Fig. 7;

Fig. 9 is a vertical section of an arrangement useful in demonstrating the principle of the present invention;

Fig. 12 is a fragmentary front elevation showing the invention embodied in a combined indicator and circuit controller; and Fig. 13 is a fragmentary elevation to larger scale showing certain features of the device illustrated in Fig. 1.

Figure 11:
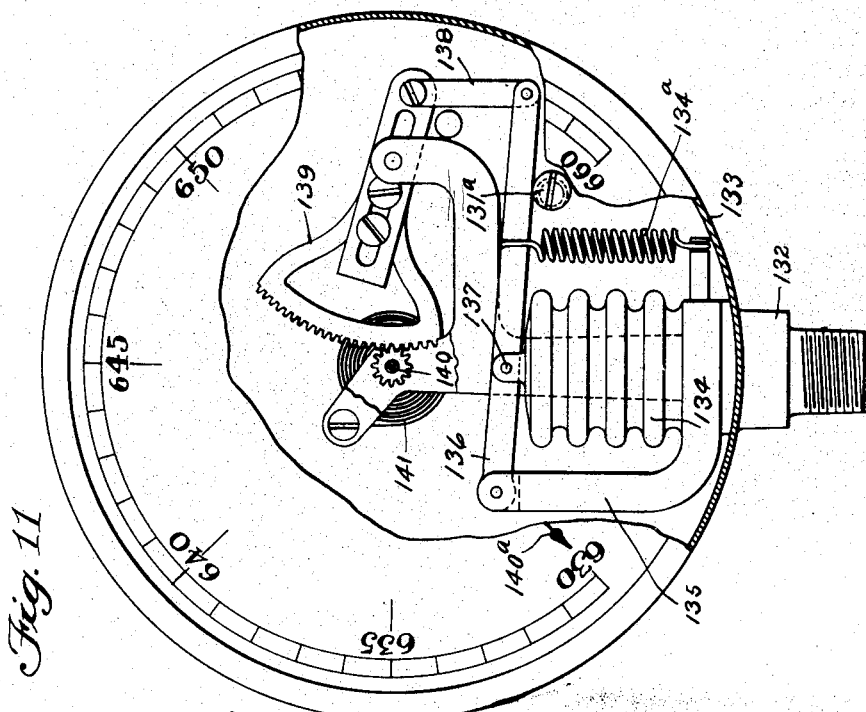
Fig. 11 is a similar front elevation showing the invention embodied in an indicating device of the sylphon type.

Referring to the drawings and particularly to Figs. 1 to 6, the numeral 1 indicates a supporting bracket which may be mounted within or form a base for a suitable receptacle or casing in which the operative mechanism of the device is enclosed, such casing being omitted from these views. This bracket or supporting base 1 is furnished with a nipple 2 adapted for connection to a pressure supply pipe and is furnished with an interior passage 3 communicating by means of an opening 4 with the interior of a Bourdon tube which is mounted in the upper part of the base 1.

The Bourdon tube herein illustrated is preferably of the duplex type comprising oppositely extending curved branches 5 and 6. Brackets 7 and 8 are attached to and form continuations of the free extremities of the branches 5 and 6 of the Bourdon tube and these brackets are furnished with oppositely directed arms 9 and 10. The arm 9 is furnished with an opening 11 which receives the hooked end of a coiled spring 12. The opposite end of the spring 12 is attached to a screw-threaded rod 14 passing freely through a smooth bore in the boss 13 carried by the bracket 10. An adjusting nut 15 has threaded engagement with the rod 14 for adjusting the latter longitudinally in the bore in the boss 13, thereby to vary the tension of the spring. A lock nut 16 may be provided if desired for retaining the rod in adjusted position.

The base member 1 is furnished with an upwardly extending bracket arm 17 having a T-shaped upper end 18. The opposite extremities of this T-shaped upper part of the bracket 17 are provided with forwardly directed lug 19 and 19', respectively, having screw-threaded openings for the reception of adjustable stop screws 210 and 220 which are adapted to engage the brackets 7 and 8 at the free ends of the Bourdon tube.

A pivot pin 20' is secured to the upper end of the bracket arm 17 and forms a pivotal support for a pair of elongate levers 20 and 21 respectively. For convenience in description these levers are hereinafter referred to respectively as the "contact" lever and the "actuator" lever.

The contact lever 20 is preferably provided with a segmental guide arm 22' furnished with an arcuate slot 23 which takes over a fixed guide pin 24 projecting forwardly from an ear 25 secured to the bracket 17. Since the slot 23 is closed at its opposite ends the pin 24 constitutes a limiting stop as well as a guide for the lever 20.

The contact lever 20 is furnished with a lug 26 adapted to engage the end of a stop screw 27 having threaded engagement with a boss 28 carried by an arm 29 projecting from the bracket 17. The screw 27 may, if desired, be provided with a lock nut 30 for retaining it in adjusted position.

The lever 20 is also furnished with a lug 31 to which one end of a coiled spring 32 is attached. The opposite end of this spring is secured to a rod 33 projecting from the bracket 17 and the spring 32 is so tensioned that it tends to swing the lever 20 in a counterclockwise direction into engagement with the stop screw 27.

The actuator lever 21 is connected to the free ends of the Bourdon tube by means of links 34 and 35 respectively. These links are pivotally connected to the lever 21 at opposite sides of its fulcrum 20' so that the force exerted by both branches of the Bourdon tube, when moving in response to pressure variations, is effective to swing the lever 21 in the same direction.

The actuator lever 21 comprises an upper part mounted upon the pin 20' and a lower part 21ª which is electrically insulated from the upper part. One convenient means of insulating the lower part 21ª from the upper part of the lever is by clamping the opposed ends of the upper and lower parts between insulating plates 36, the opposed ends of the upper and lower parts of the lever being spaced so that they do not make electrical contact.

The lower part 21ª of the lever 21 is provided with a pin 37 to which one end of a flexible conductor 38 is attached. The opposite end of this conductor is secured to a boss 39 carried by an insulating bracket 40 conveniently secured to the ear 25 by means of the guide pin 24.

The lower end of the lever member 21ª is preferably bifurcated to provide parallel prongs 44 and 45 respectively which support opposed contact elements 46 and 47. While this arrangement is preferred for ease in construction it is contemplated that a single contact member having opposed contact surfaces may be substituted for this arrangement if desired.

The lower end of the contact lever 20 carries an insulating block 48 secured to the lever by means of screws 49 and this block is provided with an elongate recess 50 in its forward face for the reception of the lower end of the lever member 21ª.

The forward face of the block 48 is also provided with elongate shallow channels for the reception of contact supporting bars 51 and 52 respectively. These bars support contact members 54 and 55 respectively at their inner ends and are provided with binding posts 56 and 57 at their outer ends. These bars are furnished with elongate slots 58 for the reception of adjusting and retaining screws 59. By loosening the screws 59 the bars may be adjusted longitudinally toward and from the center of the block.

Flexible conductors 60 and 61 are connected to the binding posts 56 and 57 respectively, and a conductor 62 is electrically connected to the post 39 above described.

Referring to Fig. 6 the apparatus hereinbefore described is indicated diagrammatically at C and is shown arranged to control the operation of a safety valve 64 mounted upon a steam generator 65. This valve is furnished with a controlling device 66 which in turn is actuable by an electric solenoid 67. Nipple 2 of the controller C is connected by a pipe 68 to the boiler 65 so that full steam pressure is permitted to act upon the Bourdon tube which, as above described, constitutes an element of the controller.

The numerals 69 and 70 designate power mains supplying electric current of proper intensity for actuating the solenoid 67. The mains 69 and 70, may, if desired, be connected by means of a manually operated switch 71 with wires 72 and 73 leading to the terminals of the solenoid. In Fig. 6 the switch is shown as positioned to make this connection and when so arranged the solenoid is energized and thereby permits the safety valve to blow. This arrangement permits manual control of the safety valve when desired but ordinarily the switch 71 is in the reverse position, indicated in dotted lines, wherein it connects the mains 69 and 70 to the wires 74 and 75 respectively. In this position the safety valve is under the automatic control of the controller C.

The relay device herein now to be described has been shown by way of example only and may be replaced by other and equivalent devices or entirely omitted if desired and forms no essential part of the present invention. Such a relay is sometimes useful in connection with a controller of the kind herein claimed, since it permits the employment of a relatively small battery current across the terminals of the control device while at the same time allowing a heavy current to be employed for doing the actual work at the solenoid 67. This relay also maintains the current through the solenoid 67 during the period in which the actuator lever 21 is swinging, as will hereinafter be described, to carry the contact 47 from circuit closing position, where it engages the contact 55, to circuit breaking position where contact 46 engages the contact 54.

The conductor 61, above referred to as leading from the binding post 57, extends to one terminal of the circuit closing winding 77 of a solenoid S', forming a part of the relay R. The other terminal of the winding 77 is connected by a wire 76 to a battery or other suitable source of electric energy indicated at B. The other terminal of battery B is connected by wire 62 to the boss 39, above described.

The conductor 60 leading from the binding post 56 extends to one terminal of a circuit breaking winding 78 of a solenoid $S^2$ also forming a part of the relay R.

The conductor 74 leads to a contact device 79 which may be connected to a contact 79$^a$ by means of a movable bridge piece 80 secured to the core of the solenoid S'. Normally the core is elevated by spring 92, thus lifting the bridge piece 80 out of contact with members 79 and 79$^a$ so that the circuit is broken at that point.

The contact 79$^a$ is connected to one terminal of a holding winding 81 of the solenoid S'. The other terminal of this holding winding is connected to a contact member 82 which is normally connected to a contact 84 by means of a movable bridge piece 83 connected to the core of the solenoid $S^2$, said core being held in normal elevated position by a spring 93. Contact member 84 is connected by a wire 85 to the conductor 73.

The conductor 76 is connected by means of a wire 87 to a contact 88 which may be electrically connected to a contact 90 by means of a bridge piece 89 also secured to the core of the solenoid S'. The contact 90 is connected by a conductor 91 to one terminal of the circuit breaking winding 78 of the solenoid $S^2$.

The operation of the device, as thus far described, is substantially as follows, it being assumed that before substantial pressure is applied to the Bourdon tube the parts occupy the position indicated in Fig. 1.

It is assumed that the Bourdon tube is so chosen that it is sensitively responsive to slight variations in pressure, for example, pressures of the order of one pound and that except for the presence of the spring 12 the free ends of the tube would move an appreciable distance in an outward direction for increments of pressure of one pound or more. It is further assumed that the safe range of movement of the tube under such conditions would be relatively small, for example of the order of sixty pounds. In other words the tube selected is of a sensitive type which could not ordinarily stand high pressures, but which within a low pressure range is quickly responsive to small pressure variations.

The tube, being of the character just described, is loaded externally by means of the spring 12 which is so tensioned by means of the screw 14 that the tube remains entirely unresponsive to increasing pressures far exceeding its normal safe range of movement. The underlying principle involved in this feature of the device will be more fully explained hereinafter.

When the spring 12 has been properly adjusted, as just described, the tension of the spring tends to move the free ends of the tube inwardly but this tendency is opposed by the adjustable stop members 210 and 220 which may, if desired, be so set that the ends of the tube maintain their normal (unloaded) position even after substantial loading by means of the spring.

When the pressure in the tube rises to such a point that it overcomes the external load supplied by the spring 12 the tube then begins to react in the ordinary manner under further increments of pressure, so that its free ends move outwardly away from each other. When the ends of the tube are in normal position the links 34 and 35 hold the actuator lever 21 substantially in the position shown in Fig. 1, and in this position the contact element 46, by engagement with the contact 54, holds the contact lever 20 in the position shown in this figure in opposition to the tension of the spring 32.

As the pressure passes the critical point where it overcomes the spring 12 the ends of the tubes move outwardly as above described and thus tend to swing the actuator lever 21 in a counterclockwise direction. Since the spring 32 constantly tends to swing the lever 20 in the same direction, the lever 20 follows the movement of the lever 21 and thus keeps the contact 54 in engagement with the contact 46 until the lever 20 has swung far enough to bring its lug 26 into engagement with the stop screw 27. When thus positioned a very slight further increase in pressure is sufficient to swing the lever 21 relatively to the lever 20 and thus carry the contact 46 out of engagement with the contact 54 and immediately thereafter to bring the contact 47 into engagement with the contact 55.

By the arrangement of the two levers which are relatively movable and by adjustment of the screw 27 it is possible to fix with great nicety the pressure at which the electrical circuits shall be made and broken.

Referring now to Fig. 6, and assuming that the switch 79 is in the dotted line position connecting the wires 69 and 70 to the wires 74 and 75, it will be noted that the lever 21 is in the position indicated in Fig. 1 where it makes contact with the member 54, thus connecting the wires 62 and 60. Since the circuit through the battery B is broken at the points 88 and 90 there is no flow of current in the system so long as the lever 21 remains in this position.

When, as above described, the lever 21 swings to the right and breaks contact at 54 and closes the circuit at 55, a circuit is made through the wire 62, the lever 21, the wire 61, the circuit making windings 77, the wire 76, and the battery B. The energization of the winding 77 draws down the core 94 of the solenoid S' so that the bridge member 80 connects the contacts 79 and 79$^a$ and the bridge member 89 connects the contacts 88 and 90.

As thus positioned circuits are formed as follows. From the main 69 through the wire 74, the contact 79, bridge piece 80, contact 79ª, the holding winds 81 of solenoid S', the contact 82, bridge piece 83, contact 84, the wire 85, the solenoid 67, the wire 75, the switch 71, and the main 70. The energization of the holding winding 81 by the main current holds the bridge piece 80 in its circuit closing position and maintains the current through the solenoid 67. The energization of the solenoid 67 operates the device 66 and thus opens the safety valve, permitting steam to blow from the generator.

As the pressure begins to fall in the generator the Bourdon tube begins to return to its normal position and the contact 47 immediately leaves the contact 55 thus breaking the battery circuit through the closing windings 77 of solenoid S'. Since the circuit is kept closed through the bridge piece 80 the safety valve remains open and continues to blow until the contact 46 engages the contact 54. When the contact 46 engages the contact 54, bridge piece 89 is still in position where it connects the contacts 88 and 90. A circuit is thus formed through the battery, through the wire 62, lever 21, wire 60, the breaking winding 78, the wire 91, the contact 90, bridge piece 89, the contact 88 and wire 76. The breaking winding 78 is thus energized, drawing down the core 95 of the solenoid S² and thus breaking the circuit through the holding winding 81. The spring 92 immediately lifts the core 94 of the solenoid S' simultaneously moving the bridge piece 80 out of engagement with the contacts 79 and 79ª and moving the bridge piece 89 out of engagement with contacts 88 and 90, thus breaking the circuit and permitting the spring 93 to return the bridge piece 83 to its normal position. The parts are thus all restored to their normal position ready for a subsequent operation.

By the employment of the relay device a proper operation of the safety valve may be obtained without danger of causing it to chatter such as might be occasioned if the circuit through the solenoid 67 were controlled directly by the contact devices 47 and 55.

In Fig. 7 I have illustrated an embodiment of the invention in which the Bourdon tube hereinbefore described is replaced by a sylphon. The sylphon is a well-known type of pressure sensitive instrument comprising an accordion-like thin walled metallic casing which expands longitudinally when subjected to internal pressure.

In Fig. 7 the numeral 101 designates such a sylphon mounted upon a bracket 100 and having its interior chamber connected to a source of pressure fluid, for example a steam generator, by means of a pipe 102.

The bracket 100 is provided with an upwardly extending arm having an overhanging portion 103 provided on its under side with a notch for the reception of a knife edge lug 104 at one end of the control lever 105. This lever is provided with an adjustable contact screw 106 which engages the upper end of the sylphon so that movement of the sylphon in response to variations in internal pressure is communicated to the lever 105, swinging the latter about the knife edge 104 as a center.

For loading the sylphon I provide an adjustable weight 107 slidable along the arm of the lever 105. The outer end of the lever 105 is furnished with oppositely directed contact elements 108 and 109 adapted respectively to engage spaced contacts 110 and 111. The contacts 110 and 111 may be connected by means of wires 112 and 113 respectively to a relay device such as that illustrated in Fig. 6 or to any other electrical apparatus which it is desired to control by the movements of the lever 105. A wire 114 connects the lever 105 with said electrical apparatus.

The operation of this device is substantially similar to that previously described it being understood that the sylphon 101 is of normally sensitive character responding rapidly to slight changes in internal pressure and being adapted to respond to pressures varying through a relatively short range. By the provision of the lever 105 and the weight 107 this sylphon is so externally loaded that it does not respond to increase in pressure until the pressure has risen to a point high enough to balance the weight 107, whereupon the sylphon becomes effective to respond to further slight increments of pressure with substantially the same degree of sensitiveness that it would normally respond to pressures of a much lower range if unloaded.

In Fig. 8 a slight modification of the arrangement shown in Fig. 7 is illustrated, the numeral 105ª indicating a lever similar to the lever 105 and actuable by a sylphon, not shown. In this modification the weight 107 is replaced by a coiled spring 115, one end of which is connected to the lever and the other end of which is secured to a threaded rod 116 passing through an opening in a bracket member 117. A nut 118 engages the threads of the rod 116 and thus permits the latter to be adjusted longitudinally to vary the tension of the spring.

When a spring is used in connection with the sylphon as well as when employed for loading a Bourdon tube as previously described the spring should be so designed that the load which it imposes will be substantially constant throughout the entire range of movement of the controller lever. To this end the spring preferably comprises a relatively large number of open coils of a diameter and wire gage such that the slight elongation of the spring corresponding to the movement of the actuator lever will distort the individual coils of the spring to a substantially inappreciable degree.

Figure 10:
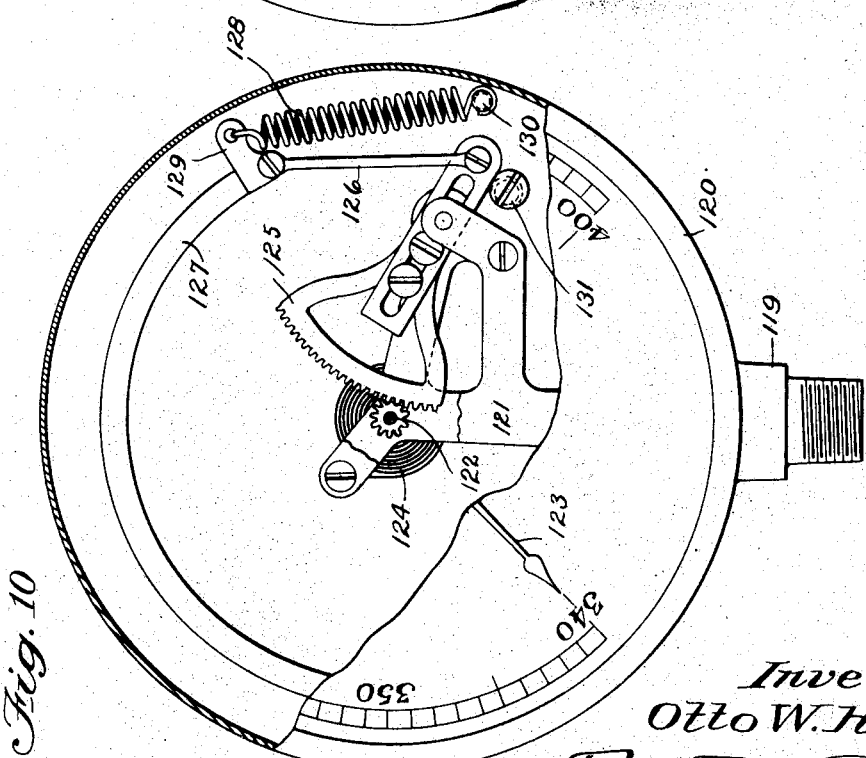
Fig. 10 is a front elevation, partly broken away, showing the present invention embodied in an indicating device of the Bourdon tube type.

Referring to Fig. 10, the underlying principle of the invention is illustrated as applied to an indicator or gage of the Bourdon type. This apparatus comprises the usual bracket 119 supporting the outer case 120 and the frame 121 which provides bearings for the staff 122. This staff is provided with the usual hair spring 124 and carries the index hand or pointer 123 which co-operates with suitable scale graduations upon the face of the gage dial. The staff 122 is also provided with the usual pinion which engages gear segment 125 pivotally supported upon the frame and which is connected by a link 126 to the free end of the Bourdon tube 127.

In accordance with the present invention a bracket 129 is attached to the free end of the Bourdon tube and a coiled spring 128 is secured at one end to this bracket and at the other to a fixed pin 130 projecting from the rear wall of the casing. This spring tends to move the Bourdon tube inwardly beyond its normal position and to limit such movement a stop 131 is provided which may conveniently engage one end of the segment lever 125, although this stop may be arranged to engage other moving parts for example it might engage the free end of the tube itself. Preferably this stop 131 is adjustable to some degree and this adjustment may be provided for by forming the stop as an eccentric pin which may be turned to different positions in its socket.

With this arrangement it is possible to employ a Bourdon tube sensitive enough to show variations in pressure of the order of one pound but to employ the apparatus for indicating pressures covering a high range, for example pressures lying between 340 and 400 pounds.

To obtain this desired result the spring 128 is so calculated that the Bourdon tube is unable to move under increases in pressure until a pressure of 340 pounds, for example, has been attained. Thereafter the tube responds sensitively to further increments in pressure of the order of one pound so that the indicator 123 moves over a substantial portion of the dial in showing pressure rise between 340 and 400 pounds.

In Fig. 11 a modification of the structure of Fig. 10 is illustrated in which a sylphon is substituted for the Bourdon tube.

In this figure the numeral 132 indicates the supporting base carrying the outer casing 133 and supporting the sylphon 134. A bracket 135 projects upwardly from the base and supports a lever 136 connected by a pin 137 to the upper end of the sylphon. The outer end of the lever 136 is connected by a link 138 to the usual segment lever 139 engaging a pinion upon a staff 140 provided with the usual hair spring 141 and indicator needle,140$^a$.

In this case the sylphon is loaded by means of a spring 134$^a$ and movement of the sylphon in response to this spring is limited by an adjustable stop 131$^a$.

In Fig. 9 I have illustrated diagrammatically the principle of operation underlying the invention herein disclosed. In this figure the numeral 142 indicates a weightless and frictionless piston working in a cylinder 143 and supporting a weightless pan 144.

Assuming that the piston is of unit area and that a weight 155 of $n$ units is placed in the pan 144 the piston will remain in its lowermost position until a pressure of $n$ units is applied to its under surface. Until such pressure has been fully attained the position of the piston is unchanged. If, now, such pressure be reached the piston will begin to rise freely in the cylinder and would continue to rise indefinitely unless stopped by external means.

If immediately before the pressure beneath the piston has reached $n$ units intensity a small additional weight be placed in the pan 144 the piston will not rise when the pressure of $n$ units intensity has been reached but when the pressure increases beyond $n$ units to an amount equivalent to the small additional weight, no matter how small such weight may be the piston will then begin to rise.

This principle of operation is that which has been employed in the controller and indicating mechanism herein described and in which the spring or the counterbalancing weight corresponds to the weight 155 shown in Fig. 9. Such spring or weight thus determines the pressure point at which the sensitive Bourdon tube, sylphon or similar device shall become effective.

When such spring or weight has once been overcome, the slightest further increments in pressure cause response of the pressure sensitive device in substantially the same way as smaller increments would act if the sensitive device were not loaded.

While in Figs. 1, 7 and 8 I have shown the invention embodied in a controller for making and breaking electrical circuits and in Figs. 10 and 11 I have shown the invention embodied in an indicator device, I contemplate the combination of controller and indicator devices in the same apparatus as shown in Fig. 12.

In this figure the numeral 156 designates a segmental gear secured to an actuator lever 21$^b$ corresponding to the actuator lever 21 of Fig. 1. This segmental gear engages a pinion 157 corresponding to the usual pinion of a gage such as shown in Figs. 10 and 11, and which is mounted upon a staff carrying an indicator needle 158. The lever 21$^b$ is provided with electrical contacts corresponding to those shown in Fig. 1 and the needle 158 co-operates with a graduated scale 159 such as is usual in a gage or indicator.

With this construction the same instrument not only indicates the rise in pressure but at the proper point actuates the pressure control apparatus, for example a safety valve.

While I have herein shown and described a Bourdon tube and a sylphon as illustrative of suitable pressure sensitive elements useful in carrying the invention into effect, I contemplate that other pressure sensitive devices may be found useful in the same connection and that such devices when loaded as hereinabove described will act substantially in the same way as the Bourdon tube or sylphon.

While I have shown the apparatus as applied to the control of a safety valve it is evident that it may be used for other purposes, for example to control the operations of a motor or engine, a water gate or water pressure relief valve, or in fact any device which it is desired to control automatically in accordance with pressure variations in a fluid medium.

While I have shown the device in several embodiments as a matter of illustration and example, I desire it to be understood that the invention is not limited to such embodiment or to the details of construction herein shown, but that it is capable of embodiment in other arrangements and environments and without reference to the materials employed or the proportions or specific arrangements of the parts which are utilized in carrying it into effect.

I claim:

1. Apparatus of the class described comprising an externally loaded Bourdon tube, a pair of co-pivotal levers, one of said levers being connected to the Bourdon tube to be moved by the later, said lever carrying an electrically insulated contact support provided with oppositely directed contact elements, an insulating block mounted upon the other lever supporting a pair of spaced contacts adapted for engagement respectively by said oppositely directed contact elements, means tending to swing the later lever in the same direction that the first lever is moved by the Bourdon tube in response to increasing pressures, and a stop to limit movement of the second lever.

2. Apparatus of the class described comprising a Bourdon tube, a loading device connected to the free end of the tube and at all times opposing movement thereof, an actuator lever connected to the free end of the tube, electrical contact means carried by the actuator lever, a contact lever co-pivotal with the actuator lever and provided with spaced contacts disposed at opposite sides of the contact means carried by the actuator lever, the later contact means normally engaging one of said spaced contacts to complete an electrical circuit and to hold the contact lever in normal position, a spring tending to swing the contact lever from normal position, and a stop limiting such movement of the contact lever and thereby permitting relative movement of the levers and engagement of the second of said spaced contacts with the contact means carried by the actuator lever to complete a second electrical circuit.

3. Apparatus of the class described comprising a Bourdon tube, a loading device connected to the free end of the tube and at all times opposing movement thereof, stop means determining the normal position of the tube, a lever connected to the free end of the tube, electrical contact means carried by the lever, a second contact engageable by said first contact means to complete an electrical circuit, means tending to move the second contact away from the first, and adjustable stop means for limiting such movement of the second contact.

4. Apparatus of the class described comprising a Bourdon tube, a normally fixed stop positively limiting movement of the tube in one direction, a loading device connected to the free end of the tube and at all times tending to move the tube in said direction, an actuator lever connected to the free end of the tube, electrical contact means carried by the actuator lever, a contact lever co-pivotal with the actuator lever, an electrical contact element mounted on the contact lever, a spring connected to the contact lever, said spring tending to keep the contact on the contact member in engagement with the contact means on the actuator lever, and an adjustable stop to limit movement of the contact lever.

5. Apparatus of the class described comprising a U-shaped Bourdon tube, stops normally engaging the free ends of the tube to determine their normal positions, an adjustable open coiled tension spring normally holding said ends in contact with their respective stops with a predetermined pressure, a lever, links connecting the ends of the respective ends of the tube with the lever, an electrical contact carried by the lever, a second contact cooperating with the first contact, and a movable support for the second contact, the first contact separating from the second contact after a predetermined movement of the lever.

6. Apparatus of the class described comprising a U-shaped Bourdon tube, stop means engaging the free ends of the tube to determine their normal positions, a spring normally holding the ends of the tube in contact with the stop means with a predetermined pressure, a pivoted lever, means connecting the lever at points on opposite sides of its pivot with the respective ends of the tube, an electrical circuit, and an electric contact carried by the lever, said contact constituting one terminal of the circuit.

7. Apparatus of the class described comprising a pair of pressure responsive elements tending to move in predetermined directions when subjected to fluid pressure, stop means determining the normal position of the respective elements, spring means tending to hold said elements in engagement with said stop means until a predetermined fluid pressure has been reached, an electrical circuit, a circuit breaker, and means connecting the circuit breaker to both of said pressure responsive elements.

Signed by me at Bridgeport, Connecticut, this 24 day of Aug. 1925.

OTTO W. HEISE.